(12) United States Patent
Mack et al.

(10) Patent No.: US 7,048,985 B2
(45) Date of Patent: May 23, 2006

(54) THREE-DIMENSIONAL SPACER FABRIC RESIN INFUSION MEDIA AND REINFORCING COMPOSITE LAMINA

(75) Inventors: Patrick E. Mack, Milford, MA (US); Mitchell D. Smith, New London, CT (US)

(73) Assignee: VRAC, LLC, Norwell, MA (US)

( * ) Notice: Subject to any disclaimer, the term of this patent is extended or adjusted under 35 U.S.C. 154(b) by 88 days.

(21) Appl. No.: 10/172,053

(22) Filed: Jun. 17, 2002

(65) Prior Publication Data
US 2003/0077965 A1   Apr. 24, 2003

Related U.S. Application Data

(60) Provisional application No. 60/307,109, filed on Jul. 23, 2001.

(51) Int. Cl.
B32B 5/12 (2006.01)
B32B 3/02 (2006.01)
D04B 7/12 (2006.01)

(52) U.S. Cl. .................. 428/111; 428/86; 428/105; 428/109; 428/137; 66/196

(58) Field of Classification Search ............ 428/304.4, 428/313.3, 313.5, 315.9, 411.1, 158, 105, 428/109, 137, 85, 86, 90, 111; 66/196
See application file for complete search history.

(56) References Cited

U.S. PATENT DOCUMENTS

| | | | |
|---|---|---|---|
| 2,072,152 A | 3/1937 | Blake et al. | |
| 2,495,640 A | 1/1950 | Muskat | |
| 2,632,480 A | 3/1953 | MacIntyre | |
| 2,913,036 A | 11/1959 | Smith | |
| 3,013,588 A | 12/1961 | Klingberg | |
| 3,048,198 A | 8/1962 | Koppelman et al. | |
| 3,137,898 A | 6/1964 | Geringer | |
| 4,132,755 A | 1/1979 | Johnson | |
| 4,180,645 A | 12/1979 | Emmons et al. | |
| 4,238,437 A | 12/1980 | Rolston | |
| 4,307,155 A | 12/1981 | Broxterman et al. | |
| 4,311,661 A | 1/1982 | Palmer | |
| 4,312,829 A | 1/1982 | Fourcher | |
| 4,359,437 A | 11/1982 | le Comte | |
| 4,389,447 A * | 6/1983 | Disselbeck et al. | 428/178 |
| 4,404,319 A | 9/1983 | Gardner | |
| 4,622,091 A | 11/1986 | Letterman | |
| 4,759,893 A | 7/1988 | Krauter | |
| 4,840,828 A | 6/1989 | Böttger et al. | |
| 4,873,044 A | 10/1989 | Epel | |
| 4,886,442 A | 12/1989 | McCowin et al. | |
| 4,902,215 A | 2/1990 | Seemann, III | |
| 4,931,345 A | 6/1990 | Böttger et al. | |
| 4,942,013 A | 7/1990 | Palmer et al. | |
| 4,975,311 A | 12/1990 | Lindgren | |
| 5,052,906 A | 10/1991 | Seemann | |
| 5,166,480 A * | 11/1992 | Bottger et al. | 181/292 |
| 5,175,034 A | 12/1992 | Andre De La Porte et al. | |

(Continued)

*Primary Examiner*—Terrel Morris
*Assistant Examiner*—Lynda Salvatore
(74) *Attorney, Agent, or Firm*—Brian M. Dingman, Esq.; Mirick, O'Connell, DeMallie & Lougee

(57) ABSTRACT

A three-dimensional spacer fabric resin infusion medium and reinforcing composite lamina for use in the manufacture of fiber reinforced polymer composites is disclosed. The use of the three-dimensional spacer fabric as a composite lamina aids in both the resin infusion rate and resin uniformity throughout the laminate.

11 Claims, 3 Drawing Sheets

U.S. PATENT DOCUMENTS

| | | | |
|---|---|---|---|
| 5,240,533 A | 8/1993 | Böttger et al. | |
| 5,271,982 A | 12/1993 | Verpoest et al. | |
| 5,316,462 A | 5/1994 | Seemann | |
| 5,369,183 A | 11/1994 | Okada et al. | |
| 5,391,435 A | 2/1995 | Schutyser et al. | |
| 5,420,216 A | 5/1995 | Guo et al. | |
| 5,439,635 A | 8/1995 | Seemann | |
| 5,480,697 A * | 1/1996 | Bottger et al. | 428/86 |
| 5,514,458 A * | 5/1996 | Schulze-Kadelbach et al. | 442/56 |
| 5,526,767 A | 6/1996 | McGuiness et al. | |
| 5,580,412 A * | 12/1996 | Fantino | 156/285 |
| 5,588,392 A | 12/1996 | Bailey | |
| 5,601,852 A | 2/1997 | Seemann | |
| 5,684,086 A | 11/1997 | Yang et al. | |
| 5,702,663 A | 12/1997 | Seemann | |
| 5,721,034 A | 2/1998 | Seemann, III et al. | |
| 5,874,503 A | 2/1999 | Scheibelhoffer et al. | |
| 5,904,972 A | 5/1999 | Tunis, III et al. | |
| 5,958,325 A | 9/1999 | Seemann, III et al. | |
| 5,990,260 A | 11/1999 | Pettersson | |
| 6,037,035 A | 3/2000 | Böttger | |
| 6,238,679 B1 | 5/2001 | de la Poterie | |
| 6,268,464 B1 | 7/2001 | Keinänen et al. | |
| 6,287,745 B1 | 9/2001 | Yamamura et al. | |
| 6,309,585 B1 | 10/2001 | Zheng | |
| 6,372,201 B1 | 4/2002 | Leuridan et al. | |
| 6,395,704 B1 | 5/2002 | Branlard et al. | |

* cited by examiner

THREE-DIMENSIONAL SPACER FABRIC RESIN INFUSION MEDIA AND REINFORCING COMPOSITE LAMINA

This specification is cross-referenced to Provisional Patent Application No. 60/307,109 filed Jul. 23, 2001.

BACKGROUND OF THE INVENTION

1. Field of the Invention

Fiber reinforced resin composite structures are used in the manufacture of parts and finished goods in automotive, recreation vehicle, trucking, aerospace, marine, rail, appliance, athletic equipment, container, construction, anti-corrosion, electrical and medical industries. The present invention relates generally to closed molded resin infusion and resin transfer molding techniques for the production of fiber reinforced resin plastic (composite) structures in these and other industries. More specifically it relates to the use of three-dimensional spacer fabrics in resin infusion and resin transfer molding processing of fiber reinforced plastics as part of or all of the composite laminate to act as both as an INTERLAMINA INFUSION MEDIUM that significantly improves the speed (by 200% to 400%), uniformity and ability to quality-control the transfer, delivery and distribution of matrix resin (plastic) throughout the laminate stack with utility far beyond any other product or process in prior art or on the market and as a REINFORCING COMPOSITE LAMINA that dramatically improves mechanical and structural properties in the finished composite part as applied to the manufacture of parts and finished goods in the aforementioned and other yet-to-be identified industries. It also relates to the use of three dimensional spacer fabrics as surface infusion media for the purposes of improving upon the prior art in surface vacuum infusion, described in greater detail below.

2. Description of the Prior Art

Open Molded Laminating Techniques

A typical open mold process for constructing these parts consists of laying or placing either dry fibers or previously resin-impregnated fibers (also known as "pre-pregs") into an open mold of the desired shape. Dry fiber reinforcements are saturated with liquid resin using manual techniques such as hand wet-out or spray application (processes commonly referred to as hand/contact lay-up and spray lay-up, respectively), which are then allowed to cure to form. Once placed in the open mold, pre-pregs are simply allowed to cure to form. When a flexible vacuum bag is applied to the part during the curing stage of these traditional open molding processes, atmospheric pressure can provide a slight improvement in the consolidation of the laminate prior to curing (this modification is sometimes referred to as "wet-preg vacuum bagging").

Benefits and Drawbacks of Prior Art in Open Molded Laminating

Open mold processing has relatively low start-up and implementation costs for limited-run or custom part production. The problems associated with open mold processing include: high emissions of volatile organic compounds; uneven distribution of resin within the fiber structure often resulting in over-saturated and/or under-saturated areas; formation of air voids and bubbles; and use of excess resin or waste of resin in the process. Furthermore, open molding unit production costs are relatively high due to the labor-intensity and limited throughput.

Closed Molded Resin Infusion Techniques

In closed mold processing, fiber and/or other reinforcement(s), collectively referred to as the "pre-form," are cut to fit then placed in the mold. A method of enclosing and compressing the pre-form against the mold is then employed. Resin is introduced into the pre-form by ports through the enclosure. Upon resin curing the enclosure is first removed, followed by the finished part. There are two principal closed molded resin infusion techniques commonly used to enclose and compress the pre-form against the mold, and to distribute resin through the pre-form:

VACUUM INFUSION uses one hard, rigid mold and one flexible bag or membrane that when joined are sealed to form a "closed" mold. Typically before applying the flexible bag or membrane a disposable barrier layer commonly referred to as a peel ply is placed on top of the pre-form. A peel ply allows resin to pass through it but will not stick to the resin once it is cured. A disposable infusion medium and/or perforated injection tubing is then placed on top of the peel ply to aid in the delivery and distribution of the liquid resin down through the laminate stack. In the case of a reusable vacuum bag or membrane the distribution channels may be incorporated into the bag. Vacuum pressure is then applied and draws resin through feed-lines into the mold and through the fiber pre-form. This technique is commonly referred to as surface vacuum infusion processing since the resin is introduced at the top surface of the laminate, which is described in Seeman et al. U.S. Pat. No. 5,052,906, 4,902,215 and 5,601,852.

RESIN TRANSFER MOLDING uses two hard, rigid molds that when joined are sealed and form an open cavity into which liquid resin is introduced. The resin can be introduced with or without the aid of vacuum or applied pressure.

Combinations and variations of vacuum infusion, resin transfer molding and other techniques can also be employed and will be known to those familiar with the state of the art.

Benefits and Drawbacks of Prior Art in Closed Molded Resin Infusion:

A number of benefits can be derived through the use of vacuum infusion vis-a-vis open molding and resin transfer molding techniques. Compared to open molding, labor requirements can be reduced and the rate of production from each mold can be improved. For example, labor involved in rolling out air bubbles and distributing the resin is reduced since the vacuum helps to improve the distribution of resin throughout the pre-form. Vacuum infusion also helps to maintain more consistent resin-to-glass ratios by providing the fabricator with the ability to more precisely control the resin input. Product quality and strength are improved since the vacuum removes trapped air and serves to insure tight bonding of all materials in the lay-up. Compared to resin transfer molding, vacuum infusion requires less set-up time and has much lower tooling costs. Additionally, resin transfer molding has the inherent risk of fiber washout or fiber movement/displacement due to resin flow, as well as resin racing or non-wetting in areas of complexity or varying part thickness. The greatest drawback of surface vacuum infusion is high waste and non-profit stream costs in the disposal of peel plies and surface infusion media. Surface vacuum infusion also has an inherent risk of resin pooling in low-lying areas due to loss of vacuum pressure after the passage of the resin flow front.

In these respects, the use of THREE-DIMENSIONAL SPACER FABRIC INTERLAMINA INFUSION MEDIA AND REINFORCING COMPOSITE LAMINA to aid in the transfer, delivery and distribution or resin according to the present invention substantially departs from the conventional concepts and designs of the prior art, and in so doing provides a technique and a material primarily developed for the purpose of increasing the resin distribution rate and uniformity throughout the lay up while improving mechanical properties.

SUMMARY OF THE INVENTION

In view of the foregoing disadvantages inherent in the known types of resin infusion techniques now present in the prior art, the present invention provides a new technique for resin infusion by using THREE-DIMENSIONAL SPACER FABRIC INTERLAMINA INFUSION MEDIA AND REINFORCING COMPOSITE LAMINA in the lay up.

The general purpose of the present invention, which will be described subsequently in greater detail, is to provide new three-dimensional spacer fabric resin infusion media and reinforcing composite lamina that have many of the advantages of the resin infusion techniques mentioned heretofore and many novel features that are not anticipated, rendered obvious, suggested, or even implied by any of the prior art in resin infusion, either alone or in any combination thereof.

The inventors have applied the invention to the production of composite parts and/or finished goods for use in the automotive, recreation vehicle, trucking, aerospace, marine, rail, appliance, athletic equipment, container, construction, anti-corrosion, electrical and medical industries. The inventors fully expect and hope that they or others will find similar utility and other unexpected utilities in the application of this invention in these and other yet-to-be-identified industries, and claim that such applications would squarely falls within the teaching of this patented invention.

To attain this, the present invention generally comprises the use of three-dimensional spacer fabrics as interlamina infusion media for improved speed and uniformity of resin distribution and as reinforcing composite lamina within the laminate to improve the mechanical properties of the composite part. This eliminates the need for using surface distribution media that require removal and disposal after the completion of the infusion process. Furthermore, surface resin infusion is a one-sided process in which the resin flows from the top down through the laminate stack. As both an interlamina infusion medium and a reinforcing composite lamina, the three-dimensional spacer fabric can be sandwiched in the middle and/or placed on either or both ends of the laminate schedule, or ply stacking sequence, to promote rapid and uniform distribution on all sides of the dry laminate, which greatly speeds infusion and improves composite part quality. The use of three-dimensional spacer fabric resin infusion media and reinforcing composite lamina can also assist, if desirable, in increasing laminate thickness, and allows for better visual quality control because the resin flow front line that is seen through the bag has come up through the laminate stack.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object of the present invention is to provide three-dimensional spacer fabric resin infusion media and reinforcing composite lamina that will overcome the shortcomings of the prior art devices.

An object of the present invention is to provide three-dimensional spacer fabric resin infusion media and reinforcing composite lamina for use in all resin infusion processes for composite manufacturing.

Another object is to provide three-dimensional spacer fabric resin infusion media and reinforcing composite lamina that improve infusion rates.

Another object is to provide three-dimensional spacer fabric resin infusion media and reinforcing composite lamina that improve laminate property uniformity.

Other objects and advantages of the present invention will become obvious to the reader and it is intended that these objects and advantages be within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
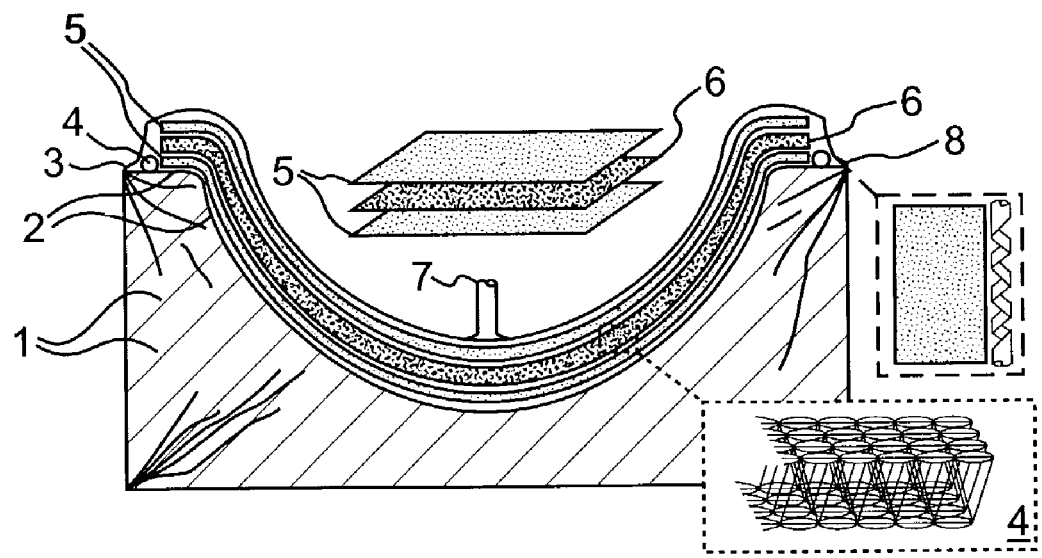
FIG. 1 is a cross sectional view of a typical vacuum infusion mold assembly comprised of one rigid mold and one flexible bag or membrane, but with a three-dimensional spacer fabric resin infusion medium and reinforcing composite lamina placed in the laminate, or ply stacking sequence. The components are: 1) the mold support structure, 2) the mold face, 3) the vacuum bag, 4) perforated resin infusion tubing (cross sectional and top view), 5) fibrous lamina, 6) three-dimensional spacer fabric, 7) vacuum tubing, 8) sealant tape, and 9) three-dimensional spacer fabric.
Figure 2:
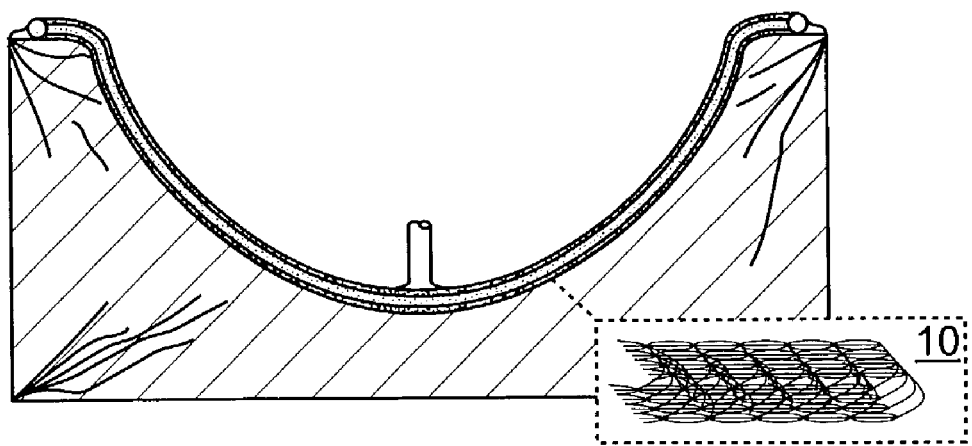
FIG. 2 is a cross sectional view of FIG. 1 with vacuum applied, and 10) is a representation of the three-dimensional spacer fabric under pressure.

Three-dimensional spacer fabrics are comprised of two outer surface fabric layers interconnected by a "Z" directional resilient yarn. The outer surface fabric layers and Z directional resilient yarn can be woven together in such a way as to hold apart or space the two outer surface fabric layers at a free form or uncompressed thickness ranging more or less from 0.01" to 1". This invention relates to use of three-dimensional spacer fabrics in resin infusion and resin transfer molding processing of fiber reinforced plastics as part of or all of the composite laminate to act as both as an INTERLAMINAR INFUSION MEDIUM that significantly improves the speed (by 200% to 400%), uniformity and ability to quality-control the transfer, delivery and distribution of matrix resin (plastic) throughout the laminate stack with utility far beyond any other product or process in prior art or on the market and as a REINFORCING COMPOSITE LAMINA that improves mechanical and structural properties in the finished composite part (increasing the fiber-to-resin ratio to aerospace grade percentages of 70%+, significantly improving strength-to-weight ratio, significantly improving shear strength, significantly improving damage tolerance, creating a "living hinge" upon failure, and many other unexpected utilities) as applied to the manufacture of parts and finished goods in automotive, recreation vehicle, trucking, aerospace, marine, rail, appliance, athletic equipment, container, construction, anti-corrosion, electrical, medical and other yet-to-be identified industries. The three dimensional spacer fabrics in question would be manufactured using machines that include, but in no way are limited to, single and double needle bar warp knitting machines. FIG. 1 shows the material in free or uncompressed form. FIG. 2 represents how three-dimensional spacer fabric compresses in the Z direction under vacuum pressure, but maintains sufficient mean free path within the three-dimensional spacer fabric architecture to provide rapid resin distribution. Three-dimensional spacer fabrics can be constructed uniformly or with combinations of a wide range of fabric and yarn fiber types, such monofilament or multifilament polyester, fiberglass, aramid, carbon, etc. The invention also comprises the use of three dimensional spacer fabric interlaminar infusion media and reinforcing composite lamina to either or both sides of which are stitched or bonded traditional fibrous lamina materials such as fiberglass mat and roving, and three dimensional spacer fabric interlaminar infusion media and reinforcing composite lamina that are stitched around other materials. This provides for the capability to produce pre-designed, "out-of-the-box" laminates that could further reduce manufacturing time and help prevent fiber washout or movement/displacement in resin transfer molding.

Turning now descriptively to the drawings, in which similar reference characters denote similar elements throughout the several views, the attached figures illustrate three-dimensional spacer fabric resin infusion media and reinforcing composite lamina, which comprises a fiber reinforced polymer composite, that enables increased infusion rates and improved property uniformity through improved resin diffusion uniformity.

As shown in FIG. 1, dry fiber reinforcement is laid into a mold of the desired shape (1). In this example, the three-dimensional spacer fabric (6) is placed between two layers of fiber reinforcement or lamina (5) to make up the laminate. A flexible sheet of plastic (3) is placed over the mold and laminate. The edges of the sheet are sealed against the mold, in this example with sealant tape (8) to form a sealed envelope surrounding the laminate. Vacuum pressure is then drawn through one or more strategically located ports (7) in the mold or plastic cover to collapse the flexible sheet against the reinforcement. The vacuum serves to shape the fibers to the mold, provide consolidation of the fibers via atmospheric pressure, and to remove any entrapped air, as shown in FIG. 2. Resin is then introduced into the envelope via perforated feed-lines, in this example spiral wrap is used (4), and the vacuum serves to draw the resin through the fiber pre-form via the three-dimensional spacer fabric. Vacuum pressure is maintained until the laminate is fully saturated with resin and subsequently cures.

Figure 3:
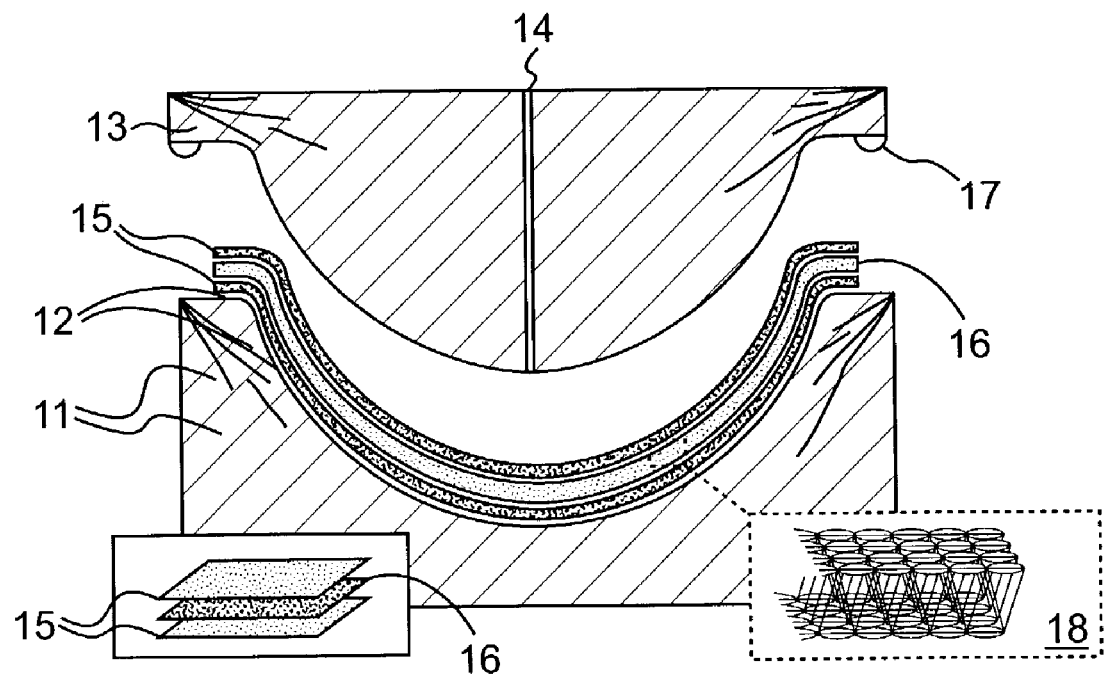
FIG. 3 is a cross sectional view of typical resin transfer molding assembly comprised of two rigid molds, but with a three-dimensional spacer fabric infusion medium and reinforcing composite lamina placed in the laminate, or ply stacking sequence. The components are 11) the mold support structure, 12) the mold face, 13) the counter mold, 14) the resin inlet, 15) the fibrous lamina, 16) the three-dimensional spacer fabric, 17) the mold perimeter seal, and 18) three-dimensional spacer fabric.
Figure 4:
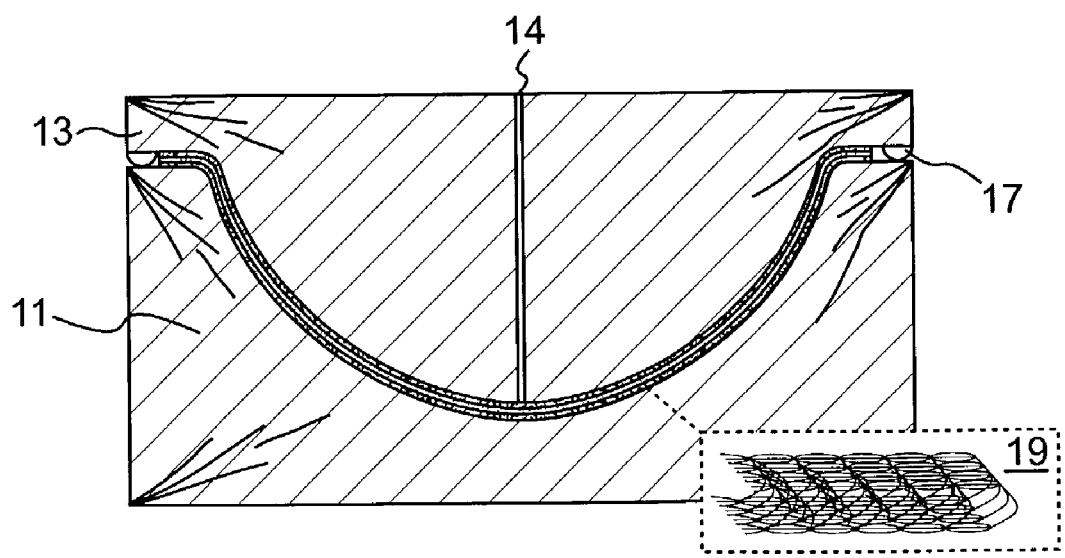
FIG. 4 is a cross sectional view of FIG. 3 with pressure applied, and 19) is a representation of the three-dimensional spacer fabric under pressure.

Another aspect of the present invention can be utilized in the production of composite parts using resin transfer molding and its variants. As shown in FIG. 3, dry fiber reinforcement is laid into a mold of the desired shape (11). In this example, the three-dimensional spacer fabric (16) is placed between two layers of fiber reinforcement or lamina (15) to make up the laminate. A rigid counter mold (13) is placed over the mold and laminate. The edges of the mold assembly are sealed against the mold, in this example with sealant (17) to form a sealed envelope surrounding the laminate. The molds are held together to maintain the seal. Resin is then introduced into the envelope via an injection port (14), and vacuum may be used to aid in the infusion process. As shown in FIG. 4, even though the three-dimensional spacer fabric may be compressed in the Z direction when the counter mold applied, sufficient mean free path remains available within the three-dimensional spacer fabric architecture to provide rapid resin distribution (19).

Figure 5:
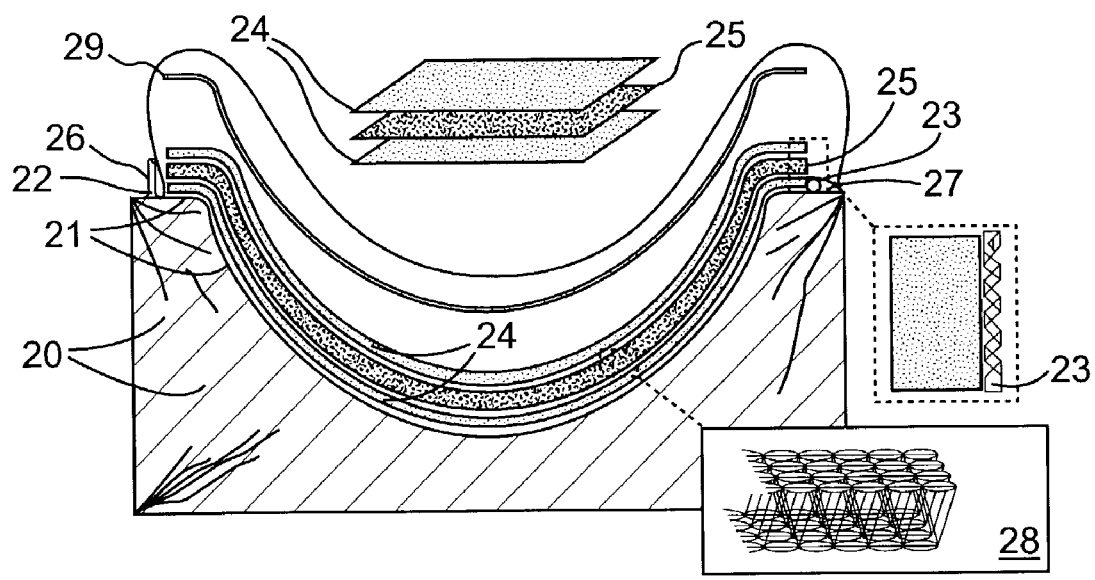
FIG. 5 is a cross sectional view of a combination resin infusion assembly comprised of both a flexible membrane and a counter mold. The components are 20) the mold support structure, 21) the mold face, 22) the vacuum bag, 23) perforated resin infusion tubing (cross sectional and top view), 24) fibrous lamina, 25) three-dimensional spacer fabric, 26) vacuum tubing, 27) sealant tape, 28) three-dimensional spacer fabric, and 29) the counter mold.
Figure 6:
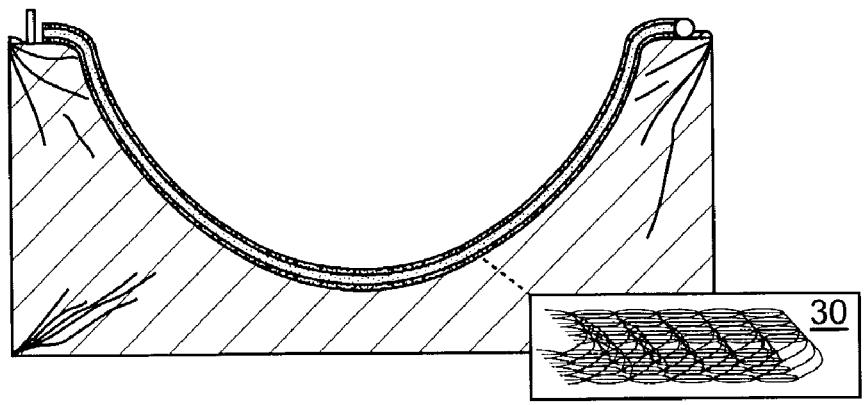
FIG. 6 is a cross sectional view of FIG. 5 with vacuum applied, and 30 is a representation of the three-dimensional spacer fabric under pressure.

Another aspect of the present invention can be utilized in the production of composite parts using a combination of vacuum infusion and resin transfer molding. As shown in FIG. 5, dry fiber reinforcement is laid into a mold of the desired shape (21). In this example, the three-dimensional spacer fabric (25) is placed between two layers of fiber reinforcement or lamina (24) to make up the laminate. A counter tool (29) is then placed over the laminate. A flexible sheet of plastic (22) is placed over the mold and laminate. The edges of the sheet are sealed against the mold, in this example with sealant tape (27) to form a sealed envelope surrounding the laminate. Vacuum pressure is then drawn through one or more strategically located ports (26) in the mold or plastic cover to collapse the flexible sheet against the reinforcement. The vacuum serves to shape the fibers to the mold, provide consolidation of the fibers via atmospheric pressure, and to remove any entrapped air, as shown in FIG. 5. Resin is then introduced into the envelope via perforated feed-lines, in this example spiral wrap is used (23), and the vacuum serves to draw the resin through the fiber pre-form via the three-dimensional spacer fabric. Vacuum pressure is maintained until the laminate is fully wet with resin and subsequently cures. As shown in FIG. 6, even though the three-dimensional spacer fabric compresses in the Z direction when vacuum is applied at the inception of resin infusion, sufficient mean free path remains available within the three-dimensional spacer fabric architecture to provide rapid resin distribution (30).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A fiber reinforced plastic composite incorporating a three-dimensional spacer fabric having first and second outer woven or knitted fabric layers connected by a plurality of intermediate spacer threads as an interlaminar infusion medium and/or reinforcing composite lamina, said spacer fabric being collapsed, fully saturated with resin, and cured in the collapsed state.

2. A fiber reinforced plastic composite incorporating a three dimensional spacer fabric having first and second outer woven or knitted fabric layers connected by a plurality of intermediate spacer threads as an interlaminar infusion medium and/or reinforcing composite lamina that is manufactured using a closed mold process that uses two hard, rigid molds that are closed and sealed to form a substantially air impermeable envelope to which negative vacuum pressure, positive applied pressure, or combinations thereof are then applied, causing substantial evacuation of air remaining in the envelope and causing said spacer fabric to collapse and remain collapsed under the influence of said pressures, introducing and distributing resin components through the plurality of voids and spaces remaining within the collapsed spacer fabric until said spacer fabric is fully saturated with said resin components, and cured in the collapsed state.

3. A fiber reinforced plastic composite incorporating a three dimensional spacer fabric having first and second outer woven or knitted fabric layers connected by a plurality of intermediate spacer threads as an interlaminar infusion medium and/or reinforcing composite lamina that is manufactured using a closed mold process that uses one hard, rigid mold and one disposable flexible vacuum bag or membrane that are closed and sealed to form a substantially air impermeable envelope to which negative vacuum pressure, positive applied pressure, or combinations thereof are then applied, causing substantially evacuation of air remaining in the envelope and causing said spacer fabric to collapse and remain collapsed under the influence of said pressures, introducing and distributing resin components through the plurality of voids and spaces remaining within the collapsed spacer fabric until said spacer fabric is fully saturated with said resin components, and cured in the collapsed state.

4. A fiber reinforced plastic composite incorporating a three dimensional spacer fabric having first and second outer woven or knitted fabric layers connected by a plurality of intermediate spacer threads as an interlaminar infusion medium and/or reinforcing composite lamina that is manufactured using a closed mold process that uses one hard, rigid mold and one reusable flexible vacuum bag or membrane that are closed and sealed to form a substantially air impermeable envelope to which negative vacuum pressure, positive applied pressure, or combinations thereof are then applied, causing substantially evacuation of air remaining in the envelope and causing said spacer fabric to collapse and remain collapsed under the influence of said pressures, introducing and distributing resin components through the plurality of voids and spaces remaining within the collapsed spacer fabric until said spacer fabric is fully saturated with said resin components, and cured in the collapsed state.

5. A fiber reinforced plastic composite incorporating a three dimensional spacer fabric having first and second outer woven or knitted fabric layers connected by a plurality of intermediate spacer threads as an interlaminar infusion medium and/or reinforcing composite lamina that is manufactured using a closed mold process that uses one hard, rigid mold, one hard, rigid float mold that lies beneath a flexible disposable vacuum bag or membrane that are closed and sealed to form a substantially air impermeable envelope to which negative vacuum pressure, positive applied pressure, or combinations thereof are then applied, causing substantial evacuation of air remaining in the envelope and causing said spacer fabric to collapse and remain collapsed under the influence of said pressures, introducing and distributing resin components through the plurality of voids and spaces remaining within the collapsed spacer fabric until said spacer fabric is fully saturated with said resin components, and cured in the collapsed state.

6. A fiber reinforced plastic composite incorporating a three dimensional spacer fabric having first and second outer woven or knitted fabric layers connected by a plurality of intermediate spacer threads as an interlaminar infusion medium and/or reinforcing composite lamina that is manufactured using a closed mold process that uses one hard, rigid mold, one hard, rigid float mold that lies beneath a flexible reusable vacuum bag or membrane that are closed and sealed to form a substantially air impermeable envelope to which negative vacuum pressure, positive applied pressure, or combinations thereof are then applied, causing substantial evacuation of air remaining in the envelope and causing said spacer fabric to collapse and remain collapsed under the influence of said pressures, introducing and distributing resin components through the plurality of voids and spaces remaining within the collapsed spacer fabric until said spacer fabric is fully saturated with said resin components, and cured in the collapsed state.

7. A fiber reinforced plastic composite incorporating a three dimensional spacer fabric having first and second outer woven or knitted fabric layers connected by a plurality of intermediate spacer threads as an interlaminar infusion medium and/or reinforcing composite lamina, which is previously impregnated with resin, and is manufactured using a closed mold process that uses one hard, rigid mold and one disposable and/or reusable flexible vacuum bag or membrane that are closed and sealed to form a substantially air impermeable envelope to which negative vacuum pressure, positive applied pressure, or combinations thereof are then applied, causing substantially evacuation of air remaining in the envelope and causing said spacer fabric to collapse and remain collapsed under the influence of said pressures, introducing and distributing resin components through the plurality of voids and spaces remaining within the collapsed spacer fabric until said spacer fabric is fully saturated with said resin components, and cured in the collapsed state.

8. A fiber reinforced plastic composite incorporating a three dimensional spacer fabric having first and second outer woven or knitted fabric layers connected by a plurality of intermediate spacer threads as an interlaminar infusion medium and/or reinforcing composite lamina, which is previously impregnated with resin, and is manufactured using a closed mold process that uses two hard, rigid molds that are closed and sealed to form a substantially air impermeable envelope to which negative vacuum pressure, positive applied pressure, or combinations thereof are then applied, causing substantially evacuation of air remaining in the envelope and causing said spacer fabric to collapse and remain collapsed under the influence of said pressures, introducing and distributing resin components through the plurality of voids and spaces remaining within the collapsed spacer fabric until said spacer fabric is fully saturated with said resin components, and cured in the collapsed state.

9. The fiber reinforced composite of claim 1 further comprising at least one layer of fiber reinforcement.

10. The fiber reinforced composite of claim 9 comprising two layers of fiber reinforcement, with said spacer fabric between said two layers.

11. The fiber reinforced composite of claim 1 wherein said spacer fabric is made of one or more of yarn and fiber types selected from the group consisting of polyester, fiberglass, aramid and carbon.

* * * * *